United States Patent [19]

Messing

[11] 3,910,851
[45] Oct. 7, 1975

[54] METHOD OF MAKING POROUS INORGANIC BODIES USING WATER-SOLUBLE ZIRCONIUM COMPOUNDS

[75] Inventor: Ralph A. Messing, Horseheads, N.Y.

[73] Assignee: Corning Glass Works, Corning, N.Y.

[22] Filed: Sept. 17, 1973

[21] Appl. No.: 397,615

[52] U.S. Cl............. 252/455 R; 252/454; 252/461; 252/463; 106/86
[51] Int. Cl.² .. B01J 29/06; B01J 29/00; C04B 7/00
[58] Field of Search........ 252/454, 455 R, 461, 463; 106/40, 75, 86

[56] References Cited
UNITED STATES PATENTS

| | | | |
|---|---|---|---|
| 2,258,787 | 10/1941 | Melaven et al. | 252/454 X |
| 2,333,903 | 11/1943 | Thomas et al. | 252/454 X |
| 2,344,911 | 3/1944 | Young | 252/454 X |
| 2,364,949 | 12/1944 | Connolly | 252/454 X |
| 2,921,859 | 1/1960 | Gordon | 106/40 R X |
| 3,642,933 | 2/1972 | Heckelsberg | 252/461 X |

Primary Examiner—Carl F. Dees
Attorney, Agent, or Firm—James A. Giblin; Clinton S. Janes, Jr.; Clarence R. Patty, Jr.

[57] ABSTRACT

Disclosed are methods of making porous bodies of $SiO_2$, $Al_2O_3$, and $TiO_2$ having average pore diameters which closely approximate the particle size of the starting material used to form the porous bodies, thereby permitting the production of porous bodies having a very uniform pore size distribution such that the diameters of about 90 percent of the pores are within ±20 percent of the average pore size of the material. The process involves forming a uniform slurry of metal oxide particles of $SiO_2$, $Al_2O_3$, or $TiO_2$ having substantially uniform particle size and a liquid binder consisting of a solution containing a water soluble zirconium compound, gently drying the slurry, and firing the mixture at a temperature below that at which the material sinters.

3 Claims, No Drawings

3,910,851

METHOD OF MAKING POROUS INORGANIC BODIES USING WATER-SOLUBLE ZIRCONIUM COMPOUNDS

RELATED APPLICATIONS

U.S. Pat. application Ser. No. 332,807 filed on Feb. 16, 1973, entitled "Enzymes Immobilized on Porous Inorganic Support Materials," now U.S. Pat. No. 3,850,751, and U.S. Pat. application Ser. No. 344,964, filed Mar. 26, 1973 and entitled "Method of Making Porous Inorganic Bodies," both applications filed in the name of R. A. Messing and assigned to the present assignee.

BACKGROUND OF THE INVENTION

This invention relates generally to the production of porous bodies consisting of metal oxides. Specifically, the invention is concerned with the production of porous bodies of silica ($SiO_2$), alumina ($Al_2O_3$) or titania ($TiO_2$) having a very closely controlled average pore diameter within the range of 100 A to 1000 A. The porous bodies are especially suitable for the immobilization of proteins such as enzymes.

The importance of being able to make porous inorganic support materials having an average pore diameter between about 100 A and 1000 A is pointed out in my copending application Ser. No. 332,807. In that application, it is shown that the immobilization of enzymes on porous, essentially water-insoluble, inorganic support materials can be greatly optimized by using porous inorganic support materials having a closely controlled average pore diameter which is related to the size of the enzyme molecule and/or the molecular size of the substrate upon which the enzyme acts. Accordingly, by knowing the size of the enzyme and/or substrate, it has been found possible to prepare very stable enzyme-carrier composites by choosing a porous inorganic carrier material having a closely controlled average pore size related to the size of molecules which are either contained within the pores or flow through the pores.

In the case of porous inorganic carriers for enzymes, it was found that the average pore diameter should be at least as large as the largest dimension of the enzyme but no larger than about 1000 A. The upper limit of about 1000 A is dictated by several observations. For example, as the average pore diameter exceeds about 1000 A, there occurs a considerable reduction in surface area available for bonding of the enzymes thereby reducing the amount of enzyme which can be loaded and resulting in an inefficient composite for many applications. Further, as the average pore diameter exceeds about 1000 A, any enzymes immobilized within such larger pores tend to detatch when exposed to turbulent, especially flow-through, environments. This is thought to be done to the loss of a protective effect provided by pores having an average pore diameter of more than 1000 A.

As a very practical matter, I have found that most enzymes can be successfully immobilized within the pores of porous inorganic carriers having an average pore diameter between about 100 A and 1000 A, preferably 100 A – 500 A, the ideal pore size within that range depending on the enzyme and/or substrate size as shown in Ser. No. 332,807. Accordingly, there presently exists a need for methods of making porous inorganic carriers having closely controlled average pore diameters within that range in a simple, inexpensive way.

Because of the importance of having readily controllable average pore sizes in organic supports which are used to immobilize enzymes, recent attention has been directed to the use of porous glass particles. Porous glass is glass having minute inter-connected "pores" throughout the glass particle. Such glass is made by subjecting a phase-separable glass (e.g., certain borosilicate glasses) to phase-separating heat treatments which result in an acid-soluble phase. That phase can be readily leached out with an acid leaving behind a porous network of connected channels of substantially uniform average diameter. Such porous glass can be made, for example, in accordance with the disclosures in U.S. Pat. No. 2,106,764 issued to Hood et al., U.S. Pat. No. 3,485,687 issued to Chapman, and U.S. Pat. No. 3,544,524 issued to Haller. The use of such porous glass to immobilize enzymes is described in U.S. Pat. No. 3,566,945 issued to Messing and U.S. Pat. No. 3,519,538, issued to Messing et al.

Although porous glass has been found to be an excellent carrier for enzymes because of its readily controllable pore size distribution, such carriers are relatively expensive to prepare because of the numerous and critical processing steps involved. Further, porous glass has been found to have less than desirable durability in alkaline environments where many enzymes have their pH optima. Because of such disadvantages associated with using porous glass, recent attempts have been made to find porous inorganic carriers which could be made relatively inexpensively and with closely controlled pore size distribution within the range of pore diameters of about 100 A to 1000 A.

In my copending application Ser. No. 344,964, there are disclosed methods for making such porous bodies which involve, very broadly, the steps of preparing a slurry of metal oxide particles of $SiO_2$, $Al_2O_3$, $TiO_2$, or ZrO having a particle size of 100 A to 1000 A and a binder solution containing various binders selected from acetic acid, magnesium acetate, zinc acetate, and propionic acid, drying the slurry, and then firing the resulting mixture at a temperature below that at which the material sinters. The products so formed were found to have a skeletal density approaching the theoretical density of the starting materials and a uniform porosity such that the diameters of 90 percent of the pores was within ±10 percent of the average pore diameter. I have now found that there exists another class of binder materials which can be used to prepare porous inorganic bodies, especially useful for the immobilization of enzymes. Those binder materials and methods for using them are described in detail hereunder.

SUMMARY OF INVENTION

Very broadly, my method for producing porous bodies from $SiO_2$, $Al_2O_3$, $TiO_2$, and mixtures thereof wherein at least about 90 percent of the diameters of the pores fall within ±20 percent of the average pore diameter value comprises the steps of forming a uniform slurry consisting of particles of $SiO_2$, $Al_2O_3$, $TiO_2$ and/or mixtures thereof, the particle size being substantially uniform and between 100 A and 1000 A, and an aqueous solution of a water-soluble zirconium compound; gently drying the slurry; and firing the dried material at about 450°C. to about 800°C. In a preferred embodiment, the water-soluble zirconium compounds are selected from the group consisting of zirconium tetrachloride, zirconium tetrabromide, zirconyl sulfate, zirconyl nitrate, zirconyl chloride, and zirconyl carbonate, and those compounds are present in concentration ranges of between about 0.01 and 2 M. The slurry made is gently dried and then fired at between about 500°C.–600°C. for 1–3 hours.

SPECIFIC EMBODIMENTS

The metal oxide particles which serve as starting materials in the preparation of the porous bodies having a substantially uniform pore size distribution in the average pore size range of 100 A to 1000 A must have closely controlled average particle sizes between 100 A and 1000 A and a surface area of at least about 5 $m^2/g$. The general technique for the preparation of the porous bodies of this invention involves three steps. The first comprises combining the metal oxide particles with a binder solution containing water-soluble zirconium compounds at room temperature or at a slightly elevated temperature (e.g., up to about 60°C., but below that at which volatilization will occur and definitely below the boiling point of the aqueous solution used). Lower temperatures to just above the freezing point can also be used, but they are generally less convenient than simply performing the mixture at room temperature. Preferably, the water-soluble zirconium compounds used in the binder solution are selected from the group consisting of $ZrCl_4$, $ZrBr_4$, $ZrOSO_4$, $ZrO(NO_3)_3$, $ZrOCl_2$, and $ZrOCO_2$, at concentrations of 0.01 M to 2 M, very preferably at about 0.1 M.

After the slurry has been thoroughly mixed and made as uniform as possible, it is gently dried, preferably at an elevated temperature approaching the boiling point of the solution (e.g., 90°C. to 100°C.), although lower temperatures can be used for longer periods. The drying step must be gentle (e.g., not at a temperature above the boiling point of the binder solution) so that the drying slurry will not be violently agitated as water is expelled. The gentle drying may be accomplished with simple air flow or by more rapid methods such as spray drying, drum drying, or vacuum drying. At this point, the gently dried product is referred to as a green body (ies) and it is fired at elevated temperatures to develop a chemical bond between the oxide particles.

The use of various zirconium compounds as binding agents has been found especially useful in maintaining a very uniform pore size distribution such that about 90 percent of the pores have a diameter within ±20 percent of the average pore diameter. Further it is thought that the use of zirconium compounds enhances the overall durability of the formed porous bodies, especially the silica bodies due to the formation of zirconium silicates in the product. Further, the use of zirconium compounds is thought to add surface amphoteric characteristics to the normally negatively surfaced-charged $SiO_2$ particles such that the resulting product is ideally suitable for the adsorption of enzymes which have both positively and negatively charged groups available for adsorption.

For the firing step, a temperature of at least 450°C. has been found necessary with a temperature range of 500°C. to 600°C. being especially preferred. Temperatures up to 800°C. can be used but such high temperatures require extreme caution to avoid destruction of the pores due to sintering of the material. In general, firing the green bodies for about 1 to 3 hours at 500°C. to 600°C. has yielded porous bodies of very closely controlled average pore diameter.

In the examples below, a variety of porous bodies were prepared from metal oxides of $SiO_2$, $Al_2O_3$, $TiO_2$ and a combination of $SiO_2$ and $Al_2O_3$. The starting materials consisted of particles of the above metal oxides having substantially uniform average particle sizes within the range of 100 A to 1000 A. Some of the physical properties of the starting materials used in the examples are shown in Table I.

TABLE I

| Metal Oxide | Particle Diameter (A) | Surface Area (meter$^2$/g) | Density (g/cc) |
|---|---|---|---|
| $SiO_2$ | 550 | 50 | 2.1–2.3 |
| $TiO_2$ | 320 | 48 | 4.2 |
| $Al_2O_3$ | 167 | 100 | 3.5–3.9 |

Indicated quantities of the above starting materials were mixed with the indicated amounts of water-soluble zirconium compounds shown in Table II to form slurries of uniform consistancy which were then gently dried in air at 90°C–100°C. overnight and thereafter fired at 525°C. to 550°C. for about 1–2 hours. After cooling, the fired bodies were submitted for porosimetry analysis using conventional mercury intrusion techniques.

Table II

| Example | Binder Solution | $SiO_2$ | $Al_2O_3$ | $TiO_2$ | Yield |
|---|---|---|---|---|---|
| 1 | 0.1M $ZrCl_4$ (17ml) | | 10g | | 9.81g |
| 2 | 0.1M $ZrCl_4$ (17ml) | 10g | | | 10.2g |
| 3 | 0.1M $ZrO(NO_3)_3$ (17ml) | 7.5g | 3.5g | | 11.5g |
| 4 | 0.1M $ZrO(NO_3)_3$ (17ml) | | | 10g | 10.07g |
| 5 | 0.1M $ZrOSO_4$ (17ml) | 7.5g | 3.5g | | 11.22g |
| 6 | 0.1M $ZrOSO_4$ (17ml) | | | 10g | 10.1g |
| 7 | 0.1M $ZrBr_4$ (17ml) | 10g | | | 10.25g |
| 8 | 0.1M $ZrBr_4$ (17ml) | | 10g | | 9.72g |
| 9 | 0.04M $ZrOCl_2$ (325ml) | 100g | | | 101.0g |
| 10 | 1.0M $ZrOCl_2$ (150ml) | 54g | | | 73.5g |
| 11 | 0.04M $ZrOCl_2$ (100ml) | | 50g | | 49.5g |

For comparative purposes, the physical properties of porous bodies made in accordance with the examples and controls of Ser. No. 344,964 were compared with the properties of porous bodies made in accordance with this invention. The indicated amounts of comparative materials shown in Table III were mixed and formed into porous bodies exactly as the materials of Table II were formed.

Table III (comparative porous bodies)

| Control Sample | Binder Solution | $SiO_2$ | $Al_2O_3$ | $TiO_2$ |
|---|---|---|---|---|
| A | 0.1M $NaC_2H_3O_2$ (17ml) | 10g | | |
| B | $H_2O$ (150ml) | 75g | 35g | |

Table III-continued (comparative porous bodies)

| Control Sample | Binder Solution | SiO$_2$ | Al$_2$O$_3$ | TiO$_2$ |
|---|---|---|---|---|
| C | 0.1M CH$_3$.COOH (17ml) | | 10g | |
| D | 0.1M CH$_3$.COOH (17ml) | | | 10g |

Various physical properties of the porous bodies made in accordance with this invention are compared in Table IV with similar properties found in the porous bodies prepared according to the disclosure of Ser. No. 344,964. It is significant to note that the properties of the porous bodies prepared using the water-soluble zirconium compounds compare favorably with those properties of the porous bodies of Ser. No. 344,964. From porosimetry data, it was found that the pore size distribution was such that the diameters of about 90 percent of the pores were within about ±20 percent of the average pore diameter.

body was within ±20 percent of the average pore diameter.

Further, the average pore diameter very closely approximates the particle size, or average particle size of the starting materials, thereby permitting close control over the ultimate average pore size.

Thus, there is provided a relatively simple and inexpensive method for making durable porous bodies having closely controlled pore distribution and average pore diameters within the range of 100 A to 1000 A. By being able to tailor make closely controlled porous bodies within that average pore size range, there is now provided another method for tailor-making porous inorganic enzyme carriers having pore sizes which maximize enzyme loading, half-life, and stability.

I claim:

1. A method for producing porous bodies from SiO$_2$, Al$_2$O$_3$, TiO$_2$ or mixtures thereof having pore diameters ranging between about 100A and 1000A wherein about 90 percent of the diameters fall within ±20 percent of the average pore diameter value, which comprises:

a. forming a uniform slurry consisting of particulate SiO$_2$, Al$_2$O$_3$, TiO$_2$, or mixtures thereof wherein the particle diameters thereof range between 100A and 1000A, the particle size being substantially uniform, and an aqueous 0.01 to 2M solution of a water-soluble zirconium compound;

b. drying the slurry at a temperature less than the boiling point of the solution; and c. firing the dried material at 450°C. to 800°C.

2. The method of claim 1 wherein the water-soluble zirconium compound is selected from ZrCl$_4$, ZrBr$_4$, ZrOSO$_4$, ZrO(NO$_3$)$_3$, ZrOCl$_2$, and ZrOCO$_2$.

3. The method of claim 2 wherein the firing of step (c) is at a temperature of 500°C. – 600°C. for about 1–3 hours.

Table IV (Comparative Data)

| Sample No. | Metal Oxide | Binder | Pore Vol. cc/g | Wall Porosity | Pore Diameter (A) Max. | Pore Diameter (A) Avg. | Pore Diameter (A) Min. | Skeletal Density (g/cc) |
|---|---|---|---|---|---|---|---|---|
| 1 | SiO$_2$ | ZrCl$_4$ | .70 | 57.8 | 550 | 450 | 250 | 1.892 |
| A | SiO$_2$ | NaC$_2$H$_3$O$_2$ | .81 | 65.3 | 680 | 510 | 350 | 2.100 |
| 2 | SiO$_2$ | ZrBr$_4$ | .70 | 58.1 | 580 | 390 | 250 | 1.831 |
| 3 | SiO$_2$-Al$_2$O$_3$ | ZrOSO$_4$ | .79 | 66.5 | 550 | 425 | 150 | 2.261 |
| B | SiO$_2$-Al$_2$O$_3$ | H$_2$O | .70 | 64.6 | 600 | 340 | 170 | 2.141 |
| 4 | SiO$_2$-Al$_2$O$_3$ | ZrO(NO$_3$)$_3$ | .66 | 56.0 | 375 | 320 | 200 | 1.802 |
| 5 | Al$_2$O$_3$ | ZrBr$_4$ | .48 | 55.2 | 200 | 180 | 130 | 2.288 |
| C | Al$_2$O$_3$ | C$_3$H$_3$COOH | .58 | 67.8 | 200 | 175 | 140 | 2.436 |
| 6 | Al$_2$O$_3$ | ZrCl$_4$ | .41 | 60.3 | 200 | 170 | 120 | 2.600 |
| 7 | TiO$_2$ | ZrOSO$_4$ | .40 | 53.1 | 325 | 300 | 200 | 2.699 |
| D | TiO$_2$ | C$_3$H$_3$COOH | .38 | 61.4 | 288 | 275 | 220 | 3.960 |
| 8 | TiO$_2$ | ZrO(NO$_3$)$_3$ | .34 | 48.3 | 270 | 260 | 175 | 2.563 |
| 9 | SiO$_2$ | ZrOCl$_2$ | 0.8 | 61.6 | 600 | 450 | 300 | 1.979 |
| 10 | SiO$_2$ | ZrOCl$_2$ | 0.44 | 47.9 | 850 | 600 | 350 | 1.882 |
| 11 | Al$_2$O$_3$ | ZrOCO$_2$ | 0.6 | 68.1 | 200A | 180 | 140 | 3.243 |

From Table IV it is also significant to note that the skeletal density of the porous bodies produced in accordance with the present methods was relatively close to the theoretical density of the metal oxide starting materials (± about 15 percent) with the notable exceptions of Examples 7 and 8 where TiO$_2$ particles were used as starting materials. There, the shifts in skeletal densities were about 46 percent and 53 percent respectively and the reasons for such shifts are not known at the present time since those samples were prepared in manners similar to Examples 1–6 and 9–11.

The most significant feature of Examples 1–11 however is that the porosimetry data indicated such a closely controlled pore size distribution that the diameters of about 90 percent of the pores of each porous